(12) United States Patent
Catala

(10) Patent No.: US 7,214,751 B2
(45) Date of Patent: May 8, 2007

(54) RADICAL POLYMERIZATION METHOD PERFORMED IN THE PRESENCE OF DISULFIDE COMPOUNDS

(75) Inventor: Jean-Marie Catala, Mundolsheim (FR)

(73) Assignee: Rhodia Chimie, Aubervilliers (FR)

( * ) Notice: Subject to any disclaimer, the term of this patent is extended or adjusted under 35 U.S.C. 154(b) by 29 days.

(21) Appl. No.: 10/487,414

(22) PCT Filed: Aug. 14, 2002

(86) PCT No.: PCT/FR02/02884

§ 371 (c)(1), (2), (4) Date: Feb. 23, 2004

(87) PCT Pub. No.: WO03/020773

PCT Pub. Date: Mar. 13, 2003

(65) Prior Publication Data

US 2004/0204553 A1 Oct. 14, 2004

(30) Foreign Application Priority Data

Aug. 28, 2001 (FR) .................................. 01 11187

(51) Int. Cl.
*C08F 2/04* (2006.01)
(52) U.S. Cl. .................. 526/223; 526/224; 526/308
(58) Field of Classification Search ............. 526/223, 526/224, 308
See application file for complete search history.

(56) References Cited

U.S. PATENT DOCUMENTS

| 3,862,975 | A | * | 1/1975 | Csontos ............ 558/245 |
| 6,512,081 | B1 | | 1/2003 | Rizzardo et al. |
| 6,596,899 | B1 | | 7/2003 | Lai |
| 6,642,318 | B1 | | 11/2003 | Chiefari et al. |
| 6,747,111 | B2 | | 6/2004 | Chiefari et al. |
| 6,962,961 | B2 | | 11/2005 | Lai |
| 2003/0233006 | A1 | | 12/2003 | Lai |
| 2004/0024132 | A1 | | 2/2004 | Chiefari et al. |
| 2005/0267274 | A1 | | 12/2005 | Lai |

FOREIGN PATENT DOCUMENTS

| EP | 0592283 A | 4/1994 |
| EP | 1 255 731 B1 | 6/2005 |
| FR | 2773161 A | 7/1999 |
| WO | WO 92/13903 A1 | 8/1992 |
| WO | WO 98/01478 A | 1/1998 |
| WO | WO 99/05099 A1 | 2/1999 |
| WO | WO 99/05099 * | 4/1999 |
| WO | WO 99/31144 A1 | 6/1999 |
| WO | WO 01/60792 A1 | 8/2001 |

OTHER PUBLICATIONS

Niwa et al., *J. Macromol. Sci-Chem.*, "Kinetics of the Photopolymerization of Vinyl Monomers by Bis(isopropyulxanthogen) Disulfide. Design of Block Copolymers." Q24 (5), pp. 567-585 (1987).*

Niwa et al, *J. Macromol. Sci.-Chem.*, "Kinetics of the Photopolymerization of Vinyl Monomers by Bis(isopropylxanthogen) Disulfide. Design of Block Copolymers," A24(5), pp. 567-585 (1987).

* cited by examiner

*Primary Examiner*—Robert D. Harlan
(74) *Attorney, Agent, or Firm*—Buchanan, Ingersoll & Rooney PC

(57) ABSTRACT

The invention relates to a method of preparing a composition of living polymers comprising a non-photoinitiated radical polymerization step using a composition consisting of: at least one ethylenically unsaturated monomer, preferably a methacrylic monomer, at least one disulphide compound having formula (II), i.e. $Z^1$—C(=S)—S—S—C(=S)—$Z^2$; and at least one thermally-activate free radical source which is different from the formula (II) compound.

18 Claims, No Drawings

RADICAL POLYMERIZATION METHOD PERFORMED IN THE PRESENCE OF DISULFIDE COMPOUNDS

The present invention relates to a process for the radical polymerization of ethylenically unsaturated monomers, and in particular of methacrylic monomers, giving rise to compositions comprising polymers with reactivatable chain ends, which can be used in particular for the preparation of block copolymers.

In the present description, unless otherwise indicated, the term "polymer" will be used to denote, in the broad sense, both homopolymers and copolymers.

Furthermore, within the meaning of the invention, the term "block copolymer" is understood to mean a copolymer comprising at least two successive sequences (blocks) of monomer units with different chemical constitutions. Each of the blocks present can be composed of a homopolymer or of a copolymer obtained from a mixture of ethylenically unsaturated monomers. In the second case, the block can in particular be a random copolymer. The block copolymers within the meaning of the invention can thus comprise two blocks each composed of random copolymers. In this case, the ethylenically unsaturated monomers are such that the blocks obtained are of different natures. The term "blocks of different natures" is understood to mean either blocks composed of monomers of different types or blocks composed of monomers of the same type but in different amounts.

Such block copolymers are usually prepared by ionic polymerization. However, this method of preparation exhibits the disadvantage of only making possible the polymerization of a limited number of monomers, of nonpolar type, such as styrene or butadiene. Furthermore, ionic polymerization generally requires severe processing restrictions and in particular a reaction medium which is particularly devoid of impurities and processing temperatures which are often below ambient temperature, so as to minimize the appearance of side reactions.

Such restrictions do not exist in the case of radical polymerization, which additionally exhibits the advantage of being able to be employed in the context of the polymerization of other types of monomers. For this reason, interest was quickly displayed in radical polymerization in the context of the preparation of block copolymers.

However, during a conventional radical polymerization reaction, the growing macroradicals generally have a nonselective reactivity and the chains end irreversibly by coupling or disproportionation. Consequently, in radical polymerization, it is generally very difficult to control the structure of the chains produced and it is in particular extremely difficult to produce polymers functionalized at the chain end, which limits, in the most general case, the possibilities of obtaining block copolymers by radical polymerization.

To overcome this type of difficulty, specific radical polymerization processes have recently been developed in which the polymer chains produced are functionalized by end groups capable of being able to be reactivated in the form of free radicals by virtue of reversible transfer or termination reactions.

This type of specific radical polymerization is generally denoted by the term of "controlled" or "living" radical polymerization. These names originate from the fact that the presence of the reactivatable end groups described above results in the existence of equilibria between functionalized entities (referred to as "dormant" entities) and active entities (free radicals) which makes it possible simultaneously to control the growth of the polymer chains (achievement of narrow mass distributions and control of the average molecular mass, in particular by varying the molar ratio of monomer to precursor of active chains) and to obtain functionalized polymers, referred to as "living" polymers, that is to say polymers capable of being employed as reactivatable entities in subsequent radical polymerization reactions, which proves to be particularly advantageous in the context of the preparation of block copolymers. For further details on this subject, reference may be made in particular to K. Matyjaszewski, Editor, Controlled Radical Polymerization, ACS Symposium Series 685, American Chemical Society, Washington, D.C., 1998.

In this context, one have developed in particular many controlled (living) polymerization processes, referred to as "reversible chain-transfer" processes, employing addition-fragmentation mechanisms. This specific polymer synthesis is performed by carrying out a radical polymerization, generally initiated thermally, in the presence of reversible transfer agents and of a source of free radicals, which results in the production of functionalized polymers. This type of polymerization is one of the most appropriate technologies for synthesizing block copolymers by the radical route. For further details regarding such polymerizations, reference may be made, for example, to patent applications WO 98/01478, on behalf of Dupont de Nemours, and WO 99/35178, on behalf of Rhodia Chimie, which disclose the use of reversible transfer agents of dithioester type of RSC(=S)R' type for the synthesis of controlled-architecture copolymers, or to patent applications WO 99/35177, on behalf of Rhodia Chimie, and WO 99/31144, on behalf of Dupont de Nemours, which relate to the control of radical polymerizations by dithiocarbamate transfer agents of RSC(=S)NR'R" type. Reference may also be made to patent applications WO 98/58974, WO 00/75207 or WO 01/42312, on behalf of Rhodia Chimie, which disclose the use of xanthates of general formula RSC(=S)OR', which constitute, in the most general case, particularly advantageous reversible transfer agents.

Other routes of access have been developed to produce compositions comprising living polymers of polymethacrylate type functionalized at the chain ends which can be used to synthesize block copolymers. In this context, mention may be made, for example, of photoinitiated living polymerization processes employing specific agents known as "photoiniferters". These photoiniferters are compounds which, under photochemical activation (typically under UV radiation), are simultaneously capable of initiating the polymerization reaction and of acting as reversible transfer agents and as termination agents. Xanthate disulfides of RO(C=S)S—S(C=S)OR type, such as those described by Niwa et al. in J. Macromol. Sci. Chem., vol. A24, p. 567 (1987), constitute a typical example of photoiniferter agents which can be used to carry out a controlled radical polymerization capable of resulting in living polymer compositions. However, in the context of the use of such compounds, the living polymers obtained are specifically composed of polymer chains essentially functionalized at their two ends. The use of these living chains as reactivatable entities in the preparation of block copolymers for this reason generally results in the production of symmetrical block copolymers of (polymer 2)-(polymer 1)-(polymer 2) type and, generally, the preparation of unsymmetrical block copolymers of (polymer 1)-(polymer 2) type is not rendered possible according to this type of process.

In point of fact, the inventors have now discovered that, surprisingly, disulfide compounds of the type of xanthate disulfides, of use as photoiniferter compounds in photoinitiated living polymerization reactions mentioned above, can be employed as transfer agents in radical polymerization reactions, in combination with a thermally initiated source of free radicals, to produce living polymer compositions which can be used in particular in the context of the preparation of block polymers.

In a particularly unexpected way, the studies of the inventors have made it possible to demonstrate that the use of such disulfide compounds in a thermally initiated radical polymerization employing monomers of methacrylate type makes it possible to produce compositions comprising polymers of polymethacrylate type functionalized at the chain ends and having an effective living nature. The studies of the inventors have also made it possible to show that, in this case as in the general case, the living polymers obtained are generally monofunctionalized, which makes it possible to envisage their use in the synthesis of block copolymers of (polymethacrylate)-(polymer) type.

On the basis of these discoveries, one of the aims of the present invention is to provide a process for the radical polymerization of ethylenically unsaturated compounds, and in particular of methacrylic ester type, capable of substituting, at least in some applications, for the known processes of the state of the art.

The invention also aims at providing compositions based on polymer chains, in particular of polymethacrylate type, having a living nature, that is to say which can be reactivated in the form of free radicals capable of being used in subsequent polymerization reactions.

Another aim of the invention is to provide a process for the preparation of block copolymers comprising blocks of poly(methacrylate) type, these copolymers advantageously being unsymmetrical block copolymers.

Thus, according to a first aspect, a subject matter of the present invention is a process for the preparation of a polymer composition, comprising a stage of non-photoinitiated radical polymerization employing a composition comprising:

at least one ethylenically unsaturated monomer preferably corresponding to the formula (I) below:

  formula (I);

at least one compound corresponding to the formula (II) below:

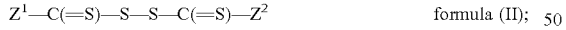  formula (II);

and at least one source of thermally activatable free radicals, other than the compound of formula (II), where, in the formula (I):
$R^1$ represents a —COOA radical, in which A denotes an alkyl, haloalkyl, perfluoroalkyl, alkenyl, alkynyl, arylalkyl, arylalkenyl or arylalkynyl group and preferably an alkyl or haloalkyl group; and
$R^2$ represents a hydrogen atom, a halogen atom, an alkyl group, a haloalkyl group or an alkoxy group, it being possible for these alkyl, haloalkyl or alkoxy groups to be unsubstituted or substituted, if appropriate by one or more substituents, each of the optional substituents then being selected, in this case, from an —OH, —$OR^S$, —$COOR^S$, —$COR^S$ or —$OOCR^S$ group, where $R^S$ denotes an alkyl, haloalkyl, perfluoroalkyl, alkenyl, alkynyl, aryl, arylalkyl, arylalkenyl or arylalkynyl group;

and where, in the formula (II):
$Z^1$ and $Z^2$ are identical or different and each represent a radical selected from:
(i) an alkyl, haloalkyl, perfluoroalkyl, alkenyl, alkynyl, acyl, aryl, arylalkyl, arylalkenyl or arylalkynyl group, or else a carbonaceous ring or a heterocycle, or else a polymer chain;
(ii) an —$OR^3$ radical, in which $R^3$ denotes a group selected from:
an alkyl, haloalkyl, perfluoroalkyl, alkenyl, alkynyl, acyl, aryl, arylalkyl, arylalkenyl or arylalkynyl group, or else a carbonaceous ring or a heterocycle, or else a polymer chain;
a —$CR^A R^B PO(OR^C)(OR^D)$ group, in which:
$R^A$ and $R^B$ each represent, independently of one another, a hydrogen atom, a halogen atom, a perfluoroalkyl group, a carbonaceous ring or a heterocycle, or else an —$NO_2$, —NCO or —CN group or a group selected from the groups of —$R^E$, —$SO_3 R^E$, —$OR^E$, —$SR^E$, —$NR^E R^F$, —$OOCR^E$, —$CONR^E R^F$ or —$SO_3 R^E$ type, in which the groups represented by $R^E$ and $R^F$ each independently denote an alkyl, alkenyl, alkynyl, aryl, arylalkyl, arylalkenyl or arylalkynyl group;
or else $R^A$ and $R^B$ together form an =O or =S group;
or else $R^A$ and $R^B$ form, together with the carbon atom to which they are attached, a hydrocarbonaceous ring or a heterocycle; and
$R^C$ and $R^D$ each represent, independently of one another, a radical corresponding to one of the definitions given above for the $R^E$ group;
or else $R^C$ and $R^D$ together form a hydrocarbonaceous chain comprising from 2 to 4 carbon atoms optionally interrupted by an —O—, —S— or —$NR^G$— group, where $R^G$ corresponds to one of the definitions given above for the $R^E$ group;

or
(iii) an —$NR^4 R^5$ group, where:
$R^4$ and $R^5$ represent, independently of one another, a radical selected from an alkyl, haloalkyl, alkenyl, alkynyl, acyl, ester, aryl, arylalkyl, arylalkenyl or arylalkynyl group or a carbonaceous ring; or
$R4$ and $R^5$ together form a hydrocarbonaceous chain comprising from 2 to 4 carbon atoms optionally interrupted by an —O—, —S— or —$NR^H$— group, where $R^H$ corresponds to one of the definitions given above for the $R^E$ group, said hydrocarbonaceous chain advantageously forming a 5-membered ring with the nitrogen to which $R^4$ and $R^5$ are attached, the $R^4$ and $R^5$ radicals preferably inducing an electron-withdrawing effect or a delocalization effect with regard to the electron density of the nitrogen atom to which they are bonded.

Throughout the present description, the term "alkyl" group is intended to cover a saturated, linear or branched, hydrocarbonaceous radical which can optionally include one or more saturated aliphatic ring(s). Within the meaning of the invention, the alkyl groups can exhibit up to 25 carbon atoms and they preferably comprise from 1 to 12 carbon atoms and advantageously from 1 to 6 carbon atoms.

Specifically, an alkyl group can also denote, within the meaning of the invention, a cycloalkyl group, that is to say a saturated cyclic hydrocarbonaceous radical, preferably exhibiting from 3 to 10 carbon atoms.

For its part, an "alkoxy" group denotes, within the meaning of the invention, an —OAlk radical, where Alk denotes an alkyl group as defined above.

The term "haloalkyl" group within the meaning of the invention is intended to denote an alkyl radical as defined above which is substituted by at least one halogen atom, where the term "halogen atom" denotes here, as throughout the description, a fluorine, chlorine, bromine or iodine atom, preferably a fluorine or chlorine atom and advantageously a fluorine atom. The "haloalkyl" groups of the invention can thus be, for example, "perfluoroalkyl" groups, that is to say, within the meaning of the invention, groups corresponding to the formula —$CH_2C_nF_{2n+1}$, where n represents an integer ranging from 1 to 20.

Furthermore, an "alkenyl" group, with the meaning employed in the present description, denotes an unsaturated, linear or branched, hydrocarbonaceous radical exhibiting at least one C=C double bond. The alkenyl groups of the invention can exhibit up to 25 carbon atoms and preferably comprise from 2 to 12 carbon atoms and advantageously from 2 to 6 carbon atoms.

Likewise, the term "alkynyl" group is intended to mean an unsaturated, linear or branched, hydrocarbonaceous radical exhibiting at least one C≡C triple bond. The alkynyl groups of the invention generally exhibit from 2 to 25 carbon atoms and they preferably comprise from 2 to 15 carbon atoms and advantageously from 2 to 6 carbon atoms.

For its part, an "acyl" group denotes, within the meaning of the invention, a group of formula —C(=O)—B where B denotes a saturated or unsaturated, linear or branched, hydrocarbonaceous chain comprising from 1 to 25 carbon atoms which can in particular be an alkyl, alkenyl or alkynyl group as defined above.

The term "ester" group is intended to mean, within the meaning of the invention, a —C(=O)—OB group, where B denotes a saturated or unsaturated, linear or branched, hydrocarbonaceous chain comprising from 1 to 25 carbon atoms which can in particular be an alkyl, alkenyl or alkynyl group as defined above.

Within the meaning of the invention, a radical of "carbonaceous ring" type denotes a saturated, unsaturated or aromatic cyclic group, in particular of cycloalkyl, cycloalkenyl or cycloalkynyl type, which is optionally substituted and which comprises from 3 to 20 carbon atoms. A radical of "heterocycle" type denotes, for its part, such a carbonaceous ring interrupted by at least one heteroatom selected, for example, from N, O or S.

For its part, an "aryl" group denotes, within the meaning of the invention, a mono- or polycyclic aromatic group generally having from 5 to 20 carbon atoms and preferably from 6 to 10 carbon atoms. Thus, it can, for example, be a phenyl group or a 1- or 2-naphthyl group. According to a specific alternative form, an "aryl" group within the meaning of the invention can incorporate one or more heteroatoms, such as sulfur, oxygen or nitrogen. In this specific case, the "aryl" group within the meaning of the invention denotes a mono- or polycyclic heteroaromatic group.

The "arylalkyl", "arylalkenyl" and "arylalkynyl" groups within the meaning of the invention are respectively alkyl, alkenyl and alkynyl chains substituted by an aryl group as defined above. In other words, the "arylalkyl", "arylalkenyl" and "arylalkynyl" groups within the meaning of the invention are respectively groups of Ar—Ra— type in which Ar— represents an aryl group and where the groups of —Ra— type respectively represent an alkylene, alkenylene or alkynylene chain.

The various radicals present in the compounds (I) and (II) can optionally be interrupted by one or more heteroatoms selected in particular from O, S, N and Si or by —(C=O)—, —(C=S)—, —$SO_2$—, —SO— or secondary or tertiary amine groups and they can be substituted by groups of any type not capable of interfering with the polymerization reaction or of resulting in side reactions between the compounds which have been brought together and in particular by one or more identical or different groups selected from a halogen atom, a silyl group or an —OH, alkoxy, —SH, thioalkoxy, —$NH_2$, mono- or dialkylamino, —CN, —COOH, ester, amine or perfluoroalkyl group, it being possible for said substituents optionally to be interrupted by heteroatoms. It is within the competence of a person skilled in the art to select the nature of the various groups and substituents present in the compounds employed in order to avoid any undesirable secondary reaction.

The disulfide compounds of formula (II) specifically employed in the process of the present invention are known compounds, some of which have been described in particular as vulcanization accelerators for tires or as compounds of iniferter agent type. These compounds are generally prepared according to a process known to a person skilled in the art, which consists of oxidizing, generally in the presence of iodine, one or more salts of anions of Z—(C=S)S⁻ type, where Z has one of the meanings given above for $Z^1$ and $Z^2$.

The compounds of formula (II) used in the process of the invention are generally such that the two $Z^1$ and $Z^2$ groups are identical. This is because the synthesis of disulfide compounds of symmetrical type is generally easier to carry out than that of the nonsymmetrical compounds. However, the process of the invention cannot be limited to the use of such symmetrical compounds.

According to a particularly advantageous embodiment of the process of the invention, each of the $Z^1$ and $Z^2$ groups present in the compound of formula (II) employed is a radical of —$OR^3$ type where $R^3$ is a radical as defined above. Thus, the compound of formula (II) employed according to the present invention can advantageously be a xanthate disulfide corresponding to the following formula (IIa):

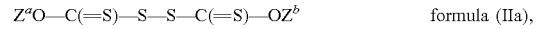   formula (IIa), in which the $Z^a$ and $Z^b$ groups, which are identical or different, each denote a radical corresponding to one of the definitions given above for $R^3$ and preferably denote radicals selected from the alkyl, haloalkyl, aryl or arylalkyl radicals. In a particularly advantageous way, each of the $Z^a$ and $Z^b$ groups denotes an alkyl, haloalkyl, aryl or arylalkyl radical. In the case where $Z^a$ or $Z^b$ denotes an alkyl radical, the latter is preferably selected from the radicals comprising from 2 to 4 carbon atoms, preferably from the ethyl or isopropyl radicals. Mention may also be made, as particularly advantageous $Z^a$ and $Z^b$ substituents, of the 2,2,2-trifluoroethyl radical or the phenyl radical.

Thus, mention may be made, as compounds of formula (IIa) which are particularly advantageous in the context of the implementation of the present invention, of:

bis(ethoxythiocarbonyl)disulfane (EtO(C=S)S—S(C=S)OEt; where Et denotes an ethyl group);
bis(phenoxythiocarbonyl)disulfane (PhO(C=S)S—S(C=S)OPh; where Ph denotes a phenyl group,;
bis(2,2,2-trifluoroethoxythiocarbonyl)disulfane 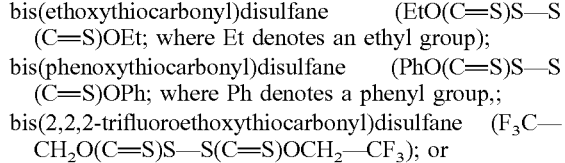 or bis(isopropyloxythiocarbonyl)disulfane (i-PrO(C=S)S—S(C=S)O-i-Pr; where i-Pr denotes an isopropyl group).

According to another embodiment of the process of the invention, each of the $Z^1$ and $Z^2$ groups present in the disulfide compound of formula (II) is selected from an alkyl group, a haloalkyl group, an alkenyl group or an alkynyl group. In this case, the $Z^1$ and $Z^2$ groups are generally identical.

According to yet another embodiment of the process of the invention, each of the $Z^1$ and $Z^2$ groups present in the disulfide compound of formula (II) is an —$NR^4R^5$ group, where the $R^4$ and $R^5$ radicals each denote an alkyl, haloalkyl, aryl, arylalkyl, acyl or ester group, or else where the $R^4$ and $R^5$ radicals form, with the nitrogen to which they are attached, a substituted or unsubstituted, preferably 5-membered, heterocycle. Examples of disulfide compounds which are particularly useful according to this specific embodiment are in particular the compounds of formula (II) where $Z^1$ and $Z^2$ each denote a group selected from an —$NR^4R^5$ group where the $R^4$ and $R^5$ radicals each denote an ethyl, phenyl or $COOCH_3$ group.

Generally, the process of the present invention can be carried out in the context of the polymerization of any ethylenically unsaturated monomer and very particularly for carrying out the polymerization of monomers corresponding to the abovementioned formula (I). The exact nature of the polymer employed according to the present invention can naturally vary depending on the specific final application for which the polymer which it is desired to obtain is intended. Thus, it should be noted in particular that the ethylenically unsaturated monomers employed according to the process of the invention can be used alone, whereby homopolymerization is obtained, or else as a mixture with other monomers, whereby random copolymerization is carried out. It is within the competence of a person skilled in the art to select the various monomer or monomers to be employed in order to obtain a polymer as desired.

The process of the invention proves to be particularly advantageous for the polymerization of monomers of methacrylic ester type.

Thus, in a particularly advantageous but in no way limiting way, the monomer of formula (I) employed in the process of the invention can correspond to the formula (Ia) below:

$H_2C=CR^1(CH_3)$   formula (Ia), in which the $R^1$ radical is as defined above and preferably denotes a —COOA group, where A denotes an alkyl or haloalkyl group within the meaning of the invention. Examples of monomers of formula (Ia) which can advantageously be used according to the invention are, for example, methyl methacrylate, ethyl methacrylate, n-butyl methacrylate, tert-butyl methacrylate, 2-ethylhexyl methacrylate, benzyl methacrylate, hydroxyethyl methacrylate, hydroxypropyl methacrylate, trifluoroethylmethacrylate, glycidyl methacrylate or trimethoxysilylpropyl methacrylate, and the mixtures of two or more of these compounds.

On this subject it should therefore be noted that the process of the invention, by the use of the compound of formula (II) and of a thermally initiated source of free radicals, makes it possible to synthesize chains of polymethacrylate type having an effective living nature.

It should be clearly emphasized that such a possibility is particularly unexpected in the light of the results generally observed during the polymerization of monomers of methacrylic ester type according to the known processes of the state of the art.

This is because, in living radical polymerization, the controlled nature of the growth of the chains becomes increasingly pronounced as the rate of reactivation of the chains in the form of free radicals increases with respect to the rate of growth of the chains (propagation), which is generally the case.

In point of fact, in the specific context of the use of monomers of methacrylate (methacrylic ester) type in living radical polymerization employing reversible transfer agents, it often happens that the propagation reaction of the chains is greatly favored in comparison with the reactivation reaction, doubtless due to the significant stabilized nature of the free radicals of methacryloyl type employed in the polymerization reaction. In this case, extremely weak, indeed even nonexistent, control of the polymerization reaction is observed, which can result in nonfunctionalization of the majority of the chains formed.

In order to avoid this problem, it is necessary to adjust the nature of the reversible transfer agent employed. However, currently, this adjustment is carried out empirically. Thus, it has, for example, been observed that the use of a dithioester or of, a dithiocarbamate generally appears preferable to that of a xanthate but the influence of the structure of the reversible transfer agent on the effectiveness of the control obtained for a polymerization of methacrylates is not known exactly.

It is thus apparent that the possibility of carrying out the synthesis of polymethacrylate chains having a living nature by employing the compounds of formula (II) is completely unexpected. The possibility of carrying out such a synthesis of functionalized polymethacrylate chains by using compounds of formula (IIa) (xanthate disulfides) is, for its part, even more particularly surprising due to the great similarity which the compounds of formula (IIa) have to xanthates, which do not always make it possible to obtain such a result.

Depending on their respective natures, the monomer of formula (I) and the disulfide compound of formula (II) can be employed in highly variable amounts in the composition subjected to the radical polymerization stage of the process of the invention. However, it is generally preferable, in the composition subjected to the polymerization reaction, for the molar ratio of the amount of compound (II) with respect to the amount of monomer (I) to be between 1:5 and 1:1000 and preferably between 1:20 and 1:500.

Whatever the exact nature of the compounds of formula (I) and (II) used, the process of the invention is specifically carried out in the presence of a thermally activatable source of free radicals which is used so as to carry out a non-photoinitiated radical polymerization of the composition used.

The term "non-photoinitiated radical polymerization" is understood to mean, within the meaning of the present invention, any polymerization carried out by employing a non-photochemical initiation stage. For this reason, it should be emphasized that the process of the invention is in particular to be distinguished from the polymerization processes of the state of the art employing a compound of formula (II) as iniferter agent, which are specifically photoinitiated, that is to say in which the formation of the free radicals initiating the radical polymerization reaction is related to a photochemical reaction generally induced by radiation of UV radiation type.

Advantageously, the non-photoinitiated radical polymerization process of the present invention employs a thermal initiation stage which generally consists in bringing the composition comprising the monomers and the thermally activatable source of free radicals to a temperature generally of the order of 0° C. to 150° C. and more often between 15° C. and 120° C.

The thermally activatable source of free radicals which is used in the process of the invention is specifically distinct from the compound (II), even in the case where this compound is capable of releasing free radicals following thermal activation.

Generally, it is also preferable for this source of free radicals to be distinct from the ethylenically unsaturated monomers employed. Thus, the thermally activatable source of free radicals which is used in the process of the invention is generally selected from the initiators conventionally employed in radical polymerization. Thus, the initiator can, for example, be an initiator selected from:

hydrogen peroxides, such as tertiary-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate;

azo compounds, such as: 2,2'-azobis(isobutyronitrile), 2,2'-azobis(2-butanenitrile), 4,4'-azobis(4-pentanoic acid), 1,1'-azobis(cyclohexane-carbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethylene-isobutyramidine)dichloride, 2,2'-azobis(2-amidino-propane)dichloride, 2,2'-azobis(N,N'-dimethylene-isobutyramide), 2,2'-azobis(2-methyl-N-[1,1-bis-(hydroxymethyl)-2-hydroxyethyl]propionamide), 2,2'-azobis(2-methyl-N-[1,1-bis(hydroxymethyl)ethyl]-propionamide), 2,2'-azobis[2-methyl-N-(2-hydroxyethyl)-propionamide] or 2,2'-azobis(isobutyramide)dihydrate; or redox systems comprising combinations such as, for example:

mixtures of hydrogen peroxide, alkyl peroxide, peresters, percarbonates and the like and of a compound selected from an iron salt, a titanium salt, zinc formaldehydesulfoxylate or sodium formaldehydesulfoxylate, and reducing sugars;

alkali metal or ammonium persulfates, perborates or perchlorates, in combination with an alkali metal bisulfite, such as sodium metabisulfite, and reducing sugars;

alkali metal persulfates in combination with an arylphosphinic acid, such as benzenephosphonic acid and other similar compounds, and reducing sugars; or a mixture of two or more of these initiators.

In the case of the use of such initiators, the amount of initiator used in the process of the invention is generally determined such that the amount of radicals capable of being able to be generated thermally is at least 100 mol % with respect to the amount of compound (II) and preferably at least 200 mol %.

In all scenarios, the radical polymerization reaction employed in the process of the present invention can be carried out in bulk, in solution, in emulsion, in dispersion or in suspension. Preferably, the polymerization of the process of the invention is carried out in solution or in emulsion.

The disulfide compound (II) employed is generally present in the polymerization medium from the beginning of the reaction. However, it should be noted that this compound can also be added during the polymerization.

The temperature at which the process of the present invention is carried out can generally vary between 0° C. and 150° C. depending on the nature of the monomers used. During the specific use of monomers corresponding to the general formula (I), this processing temperature is generally between 15° C. and 120° C. and it is preferably between 20° C. and 100° C., in particular in the case of the use of methacrylic monomers of formula (Ia).

Generally, without wishing to be committed to any one theory relating to the exact reaction mechanism employed in the polymerization reaction of the present invention, it may be put forward that the compositions employed in the process of the present invention, which comprise a thermally activatable source of free radicals, one or more ethylenically unsaturated monomer(s) of formula (I) and a disulfide compound of formula (II), result, on conclusion of the polymerization stage of the process of the invention, in the production of polymer compositions comprising first-generation living polymers composed of polymer chains having at least one of their ends an —S(C=S)—Z group, where Z has one of the meanings given above for the $Z^1$ and $Z^2$ groups of the formula (II). The presence of this functionality at the chain end can, for example, be demonstrated by mass spectrometry, in particular by spectrometry of MALDI-TOF (Matrix-Assisted Laser Desorption Ionization-Time Of Flight) type of the type of that employed in the analytical procedures described in *Macromolecular Rapid Communication*, volume 21, pp. 1035 et seq. (2000).

Furthermore, the polymer compositions obtained according to the process of the invention specifically comprise chains comprising, at one of their ends, a group characteristic of the thermal initiation carried out during the process of the invention, which depends on the exact nature of the source of free radicals employed in the process of the invention. Here again, the presence of this functional group at the chain end can be demonstrated by mass spectrometry of MALDI-TOF type.

More specifically, the polymer compositions of the invention generally include living polymer chains corresponding to the formula (P) below:

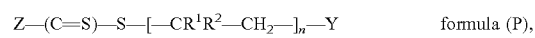

Z—(C=S)—S—[—CR¹R²—CH₂—]ₙ—Y    formula (P), in which:

the Z radical has any one of the meanings given above for the $Z^1$ and $Z^2$ groups present in the compounds of formula (II);

the $R^1$ and $R^2$ groups, which can have different meanings within each unit [—CR¹R²—CH₂—] of the formula P, represent, within each unit [—CR¹R²—CH₂—], two identical or different groups each corresponding to one of the definitions given above during the definition of the compounds of formula (I) of the process of the invention;

n denotes an integer at least equal to 1, generally less than or equal to 1000, preferably less than or equal to 500;

Y denotes a radical characteristic of the thermal initiation carried out during the polymerization of the process of the invention.

The Y radical present in the formula (P) specifically denotes a residue, the structure of which is that of a free radical capable of being generated by the thermally activatable source of free radicals employed according to the process of the invention. Furthermore, it should be noted that, in the sense in which it is used in the formula (P), the Y radical is specifically different from a radical of Z—(C=S)—S— type where Z has any one of the meanings given above for the $Z^1$ and $Z^2$ groups present in the compounds of formula (II). This radical is also different from a radical of $CH_2—Cr^1r^2—$ type, in which the $r^1$ and $r^2$ groups each correspond to one of the definitions given above for $R^1$ and $R^2$ in the compounds of formula (I) of the process of the invention.

Thus, in the formula (P), the Y radical can, for example, represent a radical of the following types: peroxide fragment, azo compound fragment, percarbonate fragment, perester fragment, persulfate fragment, perborate fragment or perchlorate fragment. In the context of the use of AIBN (2,2'-azobis(isobutyronitrile)) as thermally activated source of free radicals, the Y radical generally denotes a cyanoisopropyl group.

It should be noted that the specific presence of chains of formula (P) thus defined in the polymer compositions of the invention makes it possible in particular to distinguish the compositions obtained according to the invention from the polymer compositions obtained by the radical polymerization processes of the state of the art, in particular those which employ a compound of formula (II) as photoiniferter agent and within which no chain obtained has a group of the type of the Y group characteristic of the thermal initiation carried out according to the invention. The presence of these chains can be demonstrated in particular by mass spectrometry and especially by spectrometry of MALDI-TOF type as defined above.

In the specific context of the use of a methacrylic monomer of formula (Ia), the polymer compositions obtained generally include living polymer chains corresponding to the formula (P1) below:

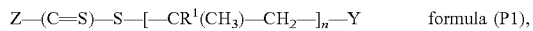

$$Z—(C═S)—S—[—CR^1(CH_3)—CH_2—]_n—Y \qquad \text{formula (P1)},$$

in which Z, $R^1$, n and Y have the abovementioned definitions.

Likewise, in the specific context of the use of a xanthate disulfide of formula (IIa) as disulfide compound and of a methacrylic monomer of formula (Ia), the polymer compositions obtained generally include living polymer chains corresponding to the formula (P2) below:

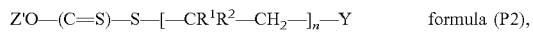

$$Z'O—(C═S)—S—[—CR^1R^2—CH_2—]_n—Y \qquad \text{formula (P2)},$$

in which Z' has one of the meanings given for $Z^a$ and $Z^b$ in the general formula (IIa) and where $R^1$, $R^2$, n and Y have the abovementioned definitions.

The polymer compositions obtained by the process of the invention, by specifically employing one or more ethylenically unsaturated monomer(s) of formula (Ia) and a xanthate disulfide of formula (IIa) as disulfide compound, which advantageously comprise living polymer chains of formula (P2), are novel and constitute another subject matter of the present invention.

Preferably, but in no way limitingly, a significant proportion of the polymer chains present in the polymer compositions obtained on conclusion of the process of the invention correspond to the general formula (P) defined above. Advantageously, a significant proportion of these chains correspond to either of the general formulae (P1) and (P2). Thus, it is preferable, in the polymer composition obtained, for at least 40%, advantageously at least 60% and particularly preferably at least 80% of the polymer chains present to correspond to the definition of the general formula (P) and, for example, to one of the definitions (P1) or (P2) as defined above. The proportion of these chains in the composition can be determined in particular by separation of the various constituents of the mixture, in particular by liquid chromatography, followed by quantitative analysis of these constituents, for example by UV spectrometry or by means of a detector of UV detector type.

According to a particularly advantageous embodiment of the invention, it is preferable for the composition obtained on conclusion of the process of the invention to be composed essentially of chains corresponding to the abovementioned definition (P), that is to say for at least 90% of the chains which it comprises, and preferably at least 95% of these chains, to correspond to said formula (P). In this context, the bulk of the chains present can correspond in particular to the definition of the general formula (P1) or alternatively to that of the general formula (P2).

The polymer compositions obtained according to the process of the invention are specifically compositions comprising living polymer chains, that is to say that they comprise polymer chains which can be reactivated during a subsequent radical polymerization.

For this reason, the polymer compositions of the invention can advantageously be employed as reactivatable polymer compositions in a copolymerization process of the type of that disclosed, for example, in patent applications WO 98/01478, WO 98/58974, WO 99/31144, WO 99/35177 or WO 99/35178, in particular for preparing block copolymers.

The use of the compositions comprising polymer chains corresponding to the formula (P1) and more generally the use of compositions obtained by employing methacrylic monomers in the process of the invention can thus result in the preparation of block copolymers incorporating blocks of poly(methacrylate) type.

The use of the polymer compositions of the invention as living (reactivatable) polymer compositions in a process for the preparation of block polymers employing the radical polymerization of a mixture comprising said reactivatable composition and at least one ethylenically unsaturated monomer constitutes another specific subject matter of the present invention.

In this context, the reactivatable compositions obtained according to the process of the present invention can in particular be employed in a process for the preparation of a second-generation block copolymer comprising a stage consisting in carrying out the radical polymerization of a mixture comprising:

a source of free radicals, at least one ethylenically unsaturated monomer, and a reactivatable polymer composition obtained according to the process of the invention.

The radical polymerization stage carried out in the process for the preparation of second-generation block copolymers of the invention is generally a radical polymerization stage of controlled type, that is to say in which the growth of the chains can be controlled. Thus, in this polymerization stage employing the reactivatable compositions of the invention, it is possible, in some cases, to render virtually linear the change in the molecular mass (Mn) as a function of the degree of conversion of the monomers.

According to a specific embodiment of the process for the preparation of second-generation block copolymers of the invention, the reactivatable polymer composition employed can advantageously be such that at least 60%, preferably at least 75% and advantageously at least 90% of the polymer chains which it comprises correspond to the definition of the general formula (P) defined above. This is because the use of this specific type of reactivatable composition according to the invention makes it possible to prepare, by bringing said polymer composition into contact with one or more ethylenically unsaturated monomers and a source of free radicals, polymer compositions comprising unsymmetrical second-generation copolymers of diblock type.

Whatever the exact nature of the reactivatable polymer composition initially employed, the stage of formation of the second-generation polymer can subsequently be repeated with new monomers and the second-generation copolymer thus obtained, so as to form a third-generation block copolymer. In particular, bringing a polymer composition comprising a polymer of diblock type into contact with one or more ethylenically unsaturated monomers and a source of free radicals will thus result in the formation of third-generation copolymers of triblock type.

The polymerization stage can thus be repeated as many times as necessary starting from a block copolymer in order to obtain a copolymer with an additional block.

For this reason, more generally, a subject matter of the present invention is a process for the preparation of an Nth-generation block copolymer, where N is an integer greater than or equal to 2, by a radical polymerization process which comprises:

(A) a first stage consisting in preparing a polymer composition according to the invention by means of a process as defined above, that is to say by means of a process comprising a non-photoinitiated radical polymerization stage employing a composition comprising:
at least one ethylenically unsaturated monomer corresponding to the abovementioned formula (I);
a disulfide compound corresponding to the formula (II) defined above; and
a thermally activatable source of free radicals other than the disulfide compound of formula (II);

then (B) a number (N−1) of successive radical polymerization stages, each of these stages resulting in the production of a polymer composition by employing a mixture comprising:
a source of free radicals,
at least one ethylenically unsaturated monomer, and
the polymer obtained in the preceding polymerization stage.

The "ethylenically unsaturated monomers" which can be used in the processes for the preparation of block polymers of the present invention are, generally, any polymer having a C=C double bond and capable of being able to result in radical polymerization under the processing conditions of said process.

Mention may be made, as ethylenically unsaturated monomers which can be used in the processes for the preparation of block polymers of the invention, for example, of:

styrene and styrene derivatives, such as α-methylstyrene or vinyltoluene;
carboxylic acid vinyl esters, such as vinyl acetate, vinyl versatate® or vinyl propionate;
vinyl halides;
unsaturated ethylenic mono- and dicarboxylic acids, such as acrylic acid, methacrylic acid, itaconic acid, maleic acid or fumaric acid, and monoalkyl esters of the dicarboxylic acids of the type mentioned with alkanols preferably having 1 to 4 carbon atoms and their N-substituted derivatives;
amides of unsaturated carboxylic acids, such as acrylamide, methacrylamide, N-methylolacrylamide or -methacrylamide, or N-alkylacrylamides;
ethylenic monomers comprising a sulfonic acid group and its alkali metal or ammonium salts, for example vinylsulfonic acid, vinylbenzenesulfonic acid, α-acrylamidomethylpropanesulfonic acid or 2-sulfoethylene methacrylate;
amides of vinylamine, in particular vinylformamide or vinylacetamide;
unsaturated ethylenic monomers comprising a secondary, tertiary or quaternary amino group or a nitrogen-comprising heterocyclic group, such as, for example, vinylpyridines, vinylimidazole, aminoalkyl (meth) acrylates and aminoalkyl(meth)acrylamides, such as dimethylaminoethyl acrylate or methacrylate, di(tert-butyl)aminoethyl acrylate or methacrylate, or dimethylaminomethylacrylamide or -methacrylamide, or zwitterionic monomers, such as, for example, sulfopropyl (dimethyl)aminopropyl acrylate;
dienes, for example butadiene or chloroprene;
acrylic esters and advantageously esters of acrylic acid with $C_1$–$C_{12}$, preferably $C_1$–$C_8$, alcohols which are optionally fluorinated and in particular methyl acrylate, ethyl acrylate, propyl acrylate, n-butyl acrylate, isobutyl acrylate, 2-ethylhexyl acrylate or t-butyl acrylate;
vinyl nitriles and in particular those having from 3 to 12 carbon atoms, such as, in particular, acrylonitrile and methacrylonitrile; and
vinylphosphonic acid and its derivatives.

These ethylenically unsaturated monomers can naturally be used alone or as mixtures.

For the preparation of polyvinylamine blocks, use is preferably made, as ethylenically unsaturated monomers, of amides of vinylamine, for example vinylformamide or vinylacetamide. The polymer obtained is then hydrolyzed at acidic or basic pH.

For the preparation of poly(vinyl alcohol) blocks, use is preferably made, as ethylenically unsaturated monomers, of carboxylic acid vinyl esters, such as, for example, vinyl acetate. The polymer obtained is then hydrolyzed at acidic or basic pH.

The types and amounts of polymerizable monomers employed according to the present invention vary according to the specific final application for which the polymer is intended. These variations are well known and can be easily determined by a person skilled in the art.

According to a specific embodiment, the reactive end(s) of the block polymers obtained according to the copolymerization process of the invention can be cleaved to form a polymer, the ends of which are thiols or hydrogen atoms. These modifications can be carried out by reduction and/or hydrolysis.

The various characteristics of the invention will become even more clearly apparent in the light of the illustrative examples set out below, which should under no circumstances limit the scope of the claimed invention.

EXAMPLE 1

Synthesis of a Reactivatable Polymer Composition Based on poly(methyl methacrylate) (PMMA) in the Presence of bis(ethoxythiocarbonyl)disulfane EtO(C=S)S—S(C=S)OEt and of Thermal Initiators 50 ml of a benzene solution comprising 23.63 g (0.236 mol) of methyl methacrylate (MMA), 0.368 g of bis(ethoxythiocarbonyl)disulfane (1.53 millimol), and a mixture of 0.243 g (1.18 millimol) of azobis(isobutyronitrile) (AIBN) and 0.245 g (1 millimol) of azobis(cyclohexane-1-carbonitrile) (V40), as thermal initiator, were introduced into a 100 ml round-bottomed flask. After degassing the solution and placing under argon, the round-bottomed flask was placed at 80° C. in a thermostatically-controlled bath.

After reacting for four hours at 80° C., the reaction medium was brought back to ambient temperature (25° C.) and the polymer obtained was precipitated from heptane. After drying under vacuum, 23 g of a polymer were obtained, which corresponds to a yield of 97.3% for the polymerization. The polymer obtained has the following characteristics (PMMA calibration):

$Mn$=11 200;
$Mw/Mn$=1.9

EXAMPLE 2

Synthesis of a poly(methyl methacrylate)-poly(vinyl acetate) Block Copolymer from the Reactivatable Polymer Composition of Example 1

50 ml of a benzene solution comprising 8 g of the polymer obtained in example 1, 14.6 mg of AIBN and 13.8 g of vinyl acetate were introduced into a 100 ml round-bottomed flask. After degassing and placing under argon, the reaction medium was placed in a thermostatically-controlled bath at 60° C.

After 72 hours, the reaction medium was brought back to ambient temperature (25° C.) and was added to heptane. A precipitate was obtained, which precipitate was filtered off and dried under vacuum. 14.6 g of a copolymer were thus isolated, which corresponds to a degree of conversion of the vinyl acetate of 47.8%. The characteristics of this copolymer by PMMA calibration are as follows:

$Mn$=21 500;
$Mw/Mn$=1.6

EXAMPLE 3

Synthesis of a poly(methyl methacrylate)-poly(2-ethylhexyl acrylate) Block Copolymer from the Reactivatable Polymer Composition of Example 1

50 ml of a benzene solution comprising 6.6 g of the polymer obtained in example 1, 14 mg of AIBN and 12 g of 2-ethylhexyl acrylate were introduced into a 100 ml round-bottomed flask. After degassing and placing under argon, the reaction medium was placed in a thermostatically-controlled bath at 60° C.

After 8 hours, the reaction medium was brought to ambient temperature (25° C.) and was added to cold heptane. A precipitate was obtained, which precipitate was filtered off and dried under vacuum. 17 g of a copolymer were thus isolated, which corresponds to a degree of conversion of the 2-ethylhexyl acrylate of 86.6%. The characteristics of this copolymer by PMMA calibration are as follows:

$Mn$=24 200;
$Mw/Mn$=2.1

EXAMPLE 4

Synthesis of a Reactivatable Polymer Composition Based on poly(methyl methacrylate) (PMMA) in the Presence of bis(ethoxythiocarbonyl)disulfane EtO(C=S)S—S(C=S)OEt and of a Thermal Initiator 50 ml of a benzene solution comprising 23.38 g (0.234 mol) of methyl methacrylate (MMA), 0.374 g (1.54 millimol) of bis(ethoxythiocarbonyl)disulfane and 0.064 g (0.39 millimol) of azobis(isobutyronitrile) (AIBN), as thermal initiator, were introduced into a 100 ml round-bottomed flask. After degassing the solution and placing under argon, the round-bottomed flask was placed at 60° C. in a thermostatically-controlled bath.

After reacting for 19 hours at 60° C., the reaction medium was brought back to ambient temperature (25° C.) and the polymer obtained was precipitated from methanol. After drying under vacuum, 15.38 g of a polymer were obtained, which corresponds to a yield of 65.8% for the polymerization. The polymer obtained has the following characteristics (PMMA calibration):

$Mn$=26 200;
$Mw/Mn$=1.55

EXAMPLE 5

Synthesis of a Reactivatable Polymer Composition Based on ploy(methyl methacrylate) (PMMA) in the presence of bis(ethoxythiocarbonyl)disulfane EtO(C=S)S—S(C=S)OEt and of a Thermal Initiator 50 ml of a benzene solution comprising 23.48 g (0.2345 mol) of methyl methacrylate (MMA), 0.372 g (1.54 millimol) of bis(ethoxythiocarbonyl)disulfane and 0.246 g (1.50 millimol) of azobis(isobutyronitrile) (AIBN), as thermal initiator, were introduced into a 100 ml round-bottomed flask. After degassing the solution and placing under argon, the round-bottomed flask was placed at 80° C. in a thermostatically-controlled bath.

After reacting for one and a half hours at 80° C., the reaction medium was brought back to ambient temperature (25° C.) and the polymer obtained was precipitated from methanol. After drying under vacuum, 19.67 g of a polymer were obtained, which corresponds to a yield of 83.8% for the polymerization. The polymer obtained has the following characteristics (PMMA calibration):

$Mn$=16 500;
$Mw/Mn$=1.56

EXAMPLE 6

Synthesis of a Reactivatable Polymer Composition Based on ploy(methyl methacrylate) (PMMA) in the presence of bis(ethoxythiocarbonyl)disulfane EtO(C=S)S—S(C=S)OEt and of a Thermal Initiator 50 ml of a benzene solution comprising 23.41 g (0.2338 mol) of methyl methacrylate (MMA), 0.380 g (1.57 millimol) of bis(ethoxythiocarbonyl)disulfane and 0.241 g (1.47 millimol) of azobis(isobutyronitrile) (AIBN), as thermal initiator, were introduced into a 100 ml round-bottomed flask. After degassing the solution and placing under argon, the round-bottomed flask was placed at 80° C. in a thermostatically-controlled bath.

After reacting for one and a half hours at 80° C., the reaction medium was brought back to ambient temperature (25° C.) and the polymer obtained was precipitated from methanol. After drying under vacuum, 20.32 g of a polymer were obtained, which corresponds to a yield of 86.8% for the polymerization. The polymer obtained has the following characteristics (PMMA calibration):

$M_n$=16 340;
$M_w/M_n$=1.59

EXAMPLE 7

Synthesis of a ploy(methyl methacrylate)-polystyrene Block Copolymer from the Reactivatable Polymer Composition of Example 4

50 ml of a benzene solution comprising 7.96 g of the polymer obtained in example 4, 0.026 g (0.156 millimol) of AIBN and 21.08 g (0.2024 mol) of styrene were introduced into a 100 ml round-bottomed flask. After degassing and placing under argon, the reaction medium was placed in a thermostatically-controlled bath at 60° C.

After reacting for 48 hours, the reaction medium was brought back to ambient temperature (25° C.) and was added to methanol. A precipitate was obtained, which precipitate was filtered off and dried under vacuum. 19.87 g of a copolymer were thus isolated, which corresponds to a degree of conversion of styrene of 56.5%. The characteristics of this copolymer by PMMA calibration are as follows:

$M_n$=52 400;
$M_w/M_n$=1.7

EXAMPLE 8

Synthesis of a ploy(methyl methacrylate)-ploy(vinyl acetate) Block Copolymer from the Reactivatable Polymer Composition of Example 4

50 ml of a benzene solution comprising 15.5 g of the polymer obtained in example 4, 0.0323 g (0.197 millimol) of AIBN and 23.17 g (0.269 mol) of vinyl acetate were introduced into a 100 ml round-bottomed flask. After degassing and placing under argon, the reaction medium was placed in a thermostatically-controlled bath at 60° C.

After reacting for 44 hours, the reaction medium was brought back to ambient temperature (25° C.) and was added to methanol. A precipitate was obtained, which precipitate was filtered off and dried under vacuum. 37.14 g of a copolymer were thus isolated, which corresponds to a degree of conversion of styrene of 93.4%. The characteristics of this copolymer by PMMA calibration are as follows:

$M_n$=63 200;
$M_w/M_n$=1.7

EXAMPLE 9

Synthesis of a ploy(methyl methacrylate)-polystyrene Block Copolymer from the Reactivatable Polymer Composition of Example 5

50 ml of a benzene solution comprising 4.57 g of the polymer obtained in example 5, 0.024 g (0.146 millimol) of AIBN and 19.73 g (0.189 mol) of styrene were introduced into a 100 ml round-bottomed flask. After degassing and placing under argon, the reaction medium was placed in a thermostatically-controlled bath at 60° C.

After reacting for 48 hours, the reaction medium was brought back to ambient temperature (25° C.) and was added to methanol. A precipitate was obtained, which precipitate was filtered off and dried under vacuum. 12.98 g of a copolymer were thus isolated, which corresponds to a degree of conversion of styrene of 42.6%. The characteristics of this copolymer by PMMA calibration are as follows:

$M_n$=42 760
$M_w/M_n$=1.8

EXAMPLE 10

Synthesis of a ploy(methyl methacrylate)-poly(vinyl acetate) Block Copolymer from the Reactivatable Polymer Composition of Example 6

50 ml of a benzene solution comprising 9.79 g of the polymer obtained in example 6, 0.0323 g (0.197 millimol) of AIBN and 23.25 g (0.27 mol) of vinyl acetate were introduced into a 100 ml round-bottomed flask. After degassing and placing under argon, the reaction medium was placed in a thermostatically-controlled bath at 60° C.

After reacting for 24 hours, the reaction medium was brought back to ambient temperature (25° C.) and was added to methanol. A precipitate was obtained, which precipitate was filtered off and dried under vacuum. 30.71 g of a copolymer were thus isolated, which corresponds to a degree of conversion of styrene of 90%. The characteristics of this copolymer by PMMA calibration are as follows:

$M_n$=44 760
$M_w/M_n$=1.8

The invention claimed is:

1. A process for the preparation of a second-generation copolymer, comprising a stage of carrying out the radical polymerization of a mixture comprising:
   (i) a source of free radicals,
   (ii) at least one ethylenically unsaturated monomer, and
   (iii) a polymer composition, said polymer composition
       (iii) being obtained by a process comprising a non-photoinitiated radical polymerization stage employing a composition comprising:
   at least one ethylenically unsaturated monomer;
   at least one compound corresponding to the formula (II) below:

$$Z^1—C(=S)—S—S—C(=S)—Z^2 \qquad \text{formula (II)},$$

and
   at least one thermally activatable source of free radicals other than the compound of formula (II), where, in the formula (II):

$Z^1$ and $Z^2$ are identical or different and each represents a radical selected from:

(i) an alkyl, haloalkyl, perfluoroalkyl, alkenyl, alkynyl, acyl, aryl, arylalkyl, arylalkenyl or arylalkynyl group, or a carbonaceous ring or a heterocycle, or a polymer chain;

(ii) an $—OR^3$ radical, in which $R^3$ is selected from:

an alkyl, haloalkyl, perfluoroalkyl, alkenyl, alkynyl, acyl, aryl, arylalkyl, arylalkenyl or arylalkynyl group, or a carbonaceous ring or a heterocycle, or a polymer chain;

a $—CR^AR^BPO(OR^C)(OR^D)$ group, in which:

$R^A$ and $R^B$ each represent, independently of one another, a hydrogen atom, a halogen atom, a perfluoroalkyl group, a carbonaceous ring or a heterocycle, or else an $—NO_2$, $—NCO$ or $—CN$ group or a group selected from $—R^E$, $—SO_3R^E$, $—OR^E$, $—SR^E$, $—NR^ER^F$, $—OOCR^E$, $—CONR_ER^F$ or $—SO_3R^E$, in which $R^E$ and $R^F$ each independently represents an alkyl, alkenyl, alkynyl, aryl, arylalkyl, arylalkenyl or arylalkynyl group;

or $R^A$ and $R^B$ together form an $=O$ or $=S$ group;

or $R^A$ and $R^B$ form, together with the carbon atom to which they are attached, a hydrocarbonaceous ring or a heterocycle; and $R^C$ and $R^D$ each represents, independently of one another, an alkyl, alkenyl, alkynyl, aryl, arylalkyl, arylalkenyl or arylalkynyl group;

or $R^C$ and $R^D$ together form a hydrocarbonaceous chain comprising from 2 to 4 carbon atoms optionally interrupted by an $—O—$, $—S—$ or $—NR^G—$ group, where $R^G$ represents an alkyl, alkenyl, alkynyl, aryl, arylalkyl, arylalkenyl or arylalkynyl group;

or (iii) an $—NR^4R^5$ group, where:

$R^4$ and $R^5$ represent, independently of one another, a radical selected from an alkyl, haloalkyl, alkenyl, alkynyl, acyl, ester, aryl, arylalkyl, arylalkenyl or arylalkynyl group or a carbonaceous ring; or $R^4$ and $R^5$ together form a hydrocarbonaceous chain comprising from 2 to 4 carbon atoms optionally interrupted by an $—O—$, $—S—$ or $—NR^H—$ group, where $R^H$ corresponds to one of the definitions given above for the $R^E$ group, wherein the second-generation copolymer is a block copolymer.

2. A process for the preparation of an Nth-generation block copolymer, N being an integer greater than 2, by a radical polymerization process which comprises:

(A) a first stage of preparing a second generation copolymer by the process of claim 1;

and (B) a number (N–1) of radical polymerization stages, each of these stages employing a mixture comprising:

a source of free radicals, at least one ethylenically unsaturated monomer, and the polymer obtained in the preceding polymerization stage.

3. The process of claim 1, wherein the two $Z^1$ and $Z^2$ groups present in the compound of formula (II) are identical.

4. The process of claim 1, wherein each of the $Z^1$ and $Z^2$ groups present in the compound of formula (II) is a group of $—OR^3$ type.

5. The process of claim 4, wherein the compound of formula (II) is a xanthate disulfide corresponding to the following formula (IIa):

$$Z^aO—C(=S)—S—S—C(=S)—OZ^b \qquad \text{formula (IIa)},$$

in which the $Z^a$ and Zb groups, which are identical or different, each represents a radical selected from alkyl, haloalkyl, aryl or arylalkyl radicals.

6. The process of claim 5, wherein each of the $Z^a$ and $Z^b$ groups present in the compound of formula (IIa) represents an alkyl radical comprising from 2 to 4 carbon atoms, a 2,2,2-trifluoroethyl radical or a phenyl radical.

7. The process of claim 1, wherein each of the $Z^1$ and $Z^2$ groups present in the compound of formula (II) is selected from an alkyl group, a haloalkyl group, an alkenyl group or an alkynyl group.

8. The process of claim 1, wherein each of the $Z^1$ and $Z^2$ groups present in the compound of formula (II) is an $—NR^4R^5$ group.

9. The process of claim 1, wherein each of the $R^4$ and $R^5$ groups represents an alkyl, haloalkyl, aryl, arylalkyl, acyl or ester group or else the $R^4$ and $R^5$ radicals form, with the nitrogen to which they are attached, a substituted or unsubstituted heterocycle.

10. The process of claim 1, wherein the ethylenically unsaturated monomer employed corresponds to the formula (I) below:

$$H_2C=CR^1R^2 \qquad \text{formula (I)},$$

in which:

$R^1$ represents a $—COOA$ radical, in which A represents an alkyl, haloalkyl, perfluoroalkyl, alkenyl, alkynyl, arylalkyl, arylalkenyl or arylalkynyl group; and $R^2$ represents a hydrogen atom, a halogen atom, an alkyl group, a haloalkyl group or an alkoxy group, wherein the alkyl, haloalkyl or alkoxy groups are unsubstituted or substituted.

11. The process of claim 10, wherein, in the composition subjected to the polymerization reaction, the molar ratio of the amount of compound (II) with respect to the amount of monomer (I) is between 1:5 and 1:10000.

12. The process of claim 10, wherein the monomer (I) employed is a methacrylic monomer corresponding to the formula (Ia) below:

$$H_2C=CR^1(CH_3) \qquad \text{formula (Ia)}.$$

13. The process of claim 12, wherein the compound of formula (II) employed according to the present invention is a xanthate disulfide corresponding to the following formula (IIa):

$$Z^aO—C(=S)—S—C(=S)—OZ^b \qquad \text{formula (IIa)},$$

in which the $Z^a$ and $Z^b$ groups are identical or different.

14. The copolymerization process of claim 1, wherein said polymer composition (iii) employed is such that at least 60% of the chains present correspond to the formula (P2) below:

$$Z'O—(C=S)—S—[—CR^1R^2=CH_2—]_n—Y \qquad \text{formula (P2)},$$

in which:

the Z radical has any one of the meanings given for the $Z^1$ and $Z^2$ groups present in the compounds of formula (II) defined in claim 1;

$R^1$ represents a $—COOA$ radical, in which A represents an alkyl, haloalkyl, perfluoroalkyl, alkenyl, alkynyl, arylalkyl, arylalkenyl or arylalkynyl group; and $R^2$ represents a hydrogen atom, a halogen atom, an alkyl group, a haloalkyl group or an alkoxy group, wherein the alkyl, haloalkyl or alkoxy groups are unsubstituted or substituted;

n represents an integer of 1 or greater;

Y represents a radical characteristic of the thermal initiation carried out during the polymerization.

15. A second generation copolymer formed by the process of claim 1.

16. An Nth-generation block copolymer, formed by the process of claim 2.

17. The process of claim 13, wherein n represents an integer of 1 to 1000.

18. The process of claim 17, wherein n represents an integer of 1 to 500.

* * * * *